United States Patent

[11] 3,591,886

| [72] | Inventor | William J. Denver |
| --- | --- | --- |
| | | 601 Nicholson St., Joliet, Ill. 60435 |
| [21] | Appl. No. | 807,261 |
| [22] | Filed | Mar. 14, 1969 |
| [45] | Patented | July 13, 1971 |

[54] DIP STICK WIPER ATTACHMENT
5 Claims, 4 Drawing Figs.

[52] U.S. Cl. ............................................. 15/210 B
[51] Int. Cl. ................................................. G01f 15/12
[50] Field of Search ........................................... 15/210.2; 33/126.7

[56] References Cited
UNITED STATES PATENTS

| 1,713,364 | 5/1929 | Arbon | 15/210.2 |
| 2,855,682 | 10/1958 | Norgard | 15/210.2 |
| 3,460,181 | 8/1969 | Denver | 15/210.2 |

OTHER REFERENCES
also considered— 3098254— 15/210.2, 1985334— 15/210.2, 2036889— 15/210.2

Primary Examiner—Walter A. Scheel
Assistant Examiner—Leon G. Machlin
Attorney—Gary, Parker, Juettner, Pigott and Cullinan ABSTRACT: A dip stick wiper attachment for the conventional dip stick guide pipe of a liquid reservoir, consisting essentially of a tubular pliant wiper member having a first portion slipped over the upper end of the guide pipe, a cup portion of large internal diameter extending above the pipe and a shoulder between said portions located at approximately the upper end of the pipe, and a hose clamp securing said first portion to the pipe. The pliant cup is manually squeezable into engagement with the dip stick as it is withdrawn from the reservoir to wipe the stick clean, and upon release flexes outwardly to accommodate normal unrestricted subsequent passage of the dip stick through the pipe to and from the reservoir for purposes of liquid level measurement. The pliant cup is always at hand to serve a wiping function and it insures automatic return to the reservoir of the fluid wiped from the stick. Also, by virtue of its large diameter, the cup accommodates the normal appurtenances on the upper end of the dip stick so that no change is required in either the dip stick or the guide pipe originally supplied with the reservoir.

PATENTED JUL 13 1971

3,591,886

Inventor:
William J. Denver
By Gary, Parker,
Juettner, Pigott & Cullinan
Att'ys

DIP STICK WIPER ATTACHMENT

BACKGROUND OF THE INVENTION

To measure the oil or other liquid level in a reservoir, it is conventional to extend a dip stick to the bottom of or a predetermined level in a body of liquid. Frequently, especially in automotive vehicles and the like, the reservoir is provided with a guide pipe for properly positioning the dip stick into the reservoir and for storing the same when it is not in use. To take a measurement, it is necessary to remove the stick, wipe it clean, reinsert it in the guide pipe and/or reservoir, again remove the stick to take the measurement, and finally restore the stick to its original position.

To facilitate the performance of this function, devices have been proposed that place wiping material at a convenient location for the operator and/or that provide for wiping of the dip stick as it is removed from the guide pipe. The former result in waste of oil and the latter, as heretofore proposed, require a replacement and/or substantial modification of the guide pipe and/or the dip stick.

The object of this invention is to simplify dip stick measurements and mitigate the stated objections of the prior practice.

The following detailed description and the accompanying drawings, submitted to acquaint those skilled in the art with the best mode presently contemplated by me for carrying my invention into practice, will reveal the several objects and advantages of this invention.

DESCRIPTION

Figure 1:
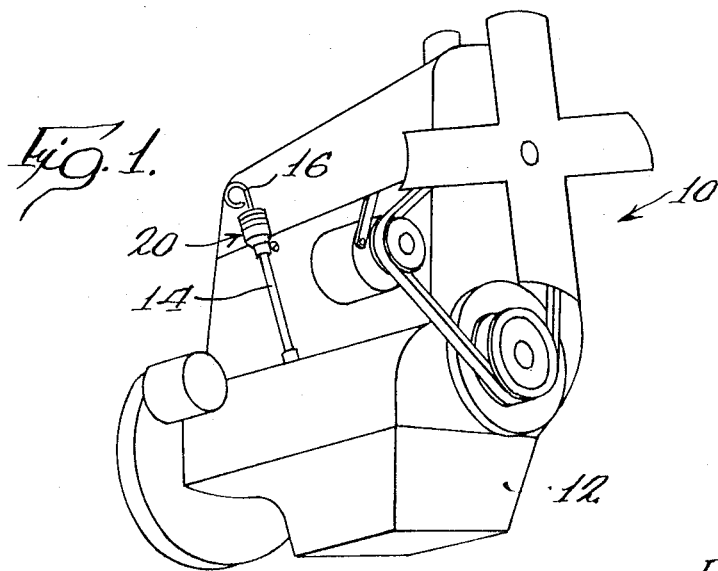
FIG. 1 is a perspective view of an internal combustion engine illustrating the dip stick wiper of this invention associated therewith.

The internal combustion engine 10 illustrated in FIG. 1 includes the conventional crank case 12 serving as an oil reservoir, and said crank case is provided with a conventional guide pipe 14 for receiving a dip stick 16 adapted to measure the level of the oil in the crank case.

The dip stick wiper of this invention, which is indicated generally at 20, is an accessory conveniently attachable to the pipe 14 without modification of the pipe or the dip stick.

Figure 2:
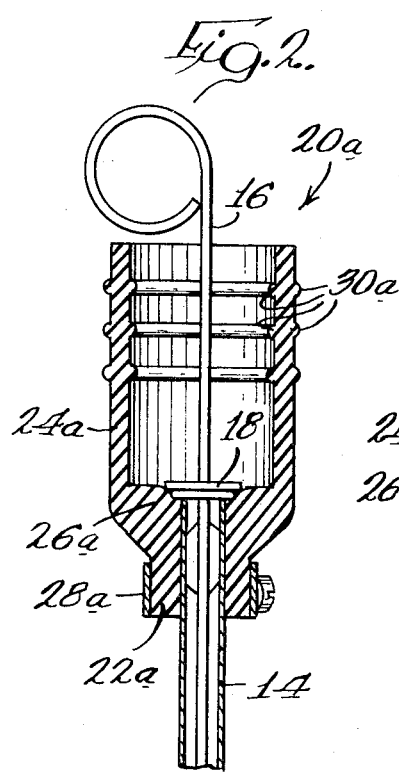
FIG. 2 is an enlarged, fragmentary side view, partly in section and partly in elevation, of a conventional guide pipe and dip stick, and one embodiment of the wiper of this invention.

Referring to FIG. 2, a first embodiment 20a of the attachment comprises a unitary, tubular, pliable molding including a first tubular position 22a of an inner diameter approximately equal to the outer diameter of the pipe 14, a cup portion 24a of a substantially larger inner diameter, and an internal shoulder 26a intermediate said portions. Preferably, the device is formed of such material and the shoulder portion 26a is made of sufficiently thick section to render the molding self-supporting or self-sustaining.

The first tubular portion 22a is adapted to be telescoped over the upper end of the guide pipe 14, minor variations in the diameter of the pipe being accommodated by the resiliency or pliability of the material and major variations being satisfied by models of different sizes, such as small, medium and large. Fixedly to secure the attachment in place, and to insure sealed engagement between the portion 22a and the pipe 14, a hose clamp 28a is provided around the portion 22a.

The cup portion 24a is adapted to extend upwardly above the upper end of the pipe, and the shoulder 26a is intended to be located at substantially the level of the top of the pipe. However, the variations in the final placement of the shoulder can be made to permit the usual and customary association of the dip stick with the pipe, i.e., with sealed engagement between the upper end of the pipe and the cap 18 normally provided on the dip stick 16.

Figure 3:
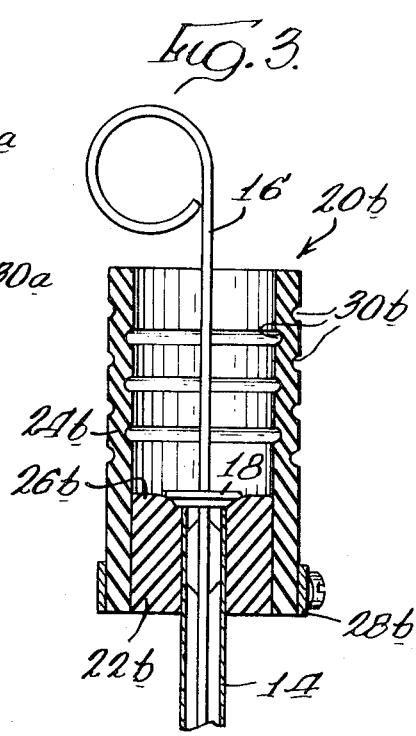
FIG. 3 is a view similar to FIG. 2 illustrating another embodiment of the wiper.

Referring to FIG. 3, a second embodiment 20b of the attachment comprises an assembly of two pieces of standardly available tubing, namely a first tube 22b telescoped over the upper end of the pipe 14, and a second tube 24b telescoped over the first tube and extending thereabove to define a cup portion. In this embodiment, a shoulder 26b is defined by the upper end of the first tube 22b, the shoulder again being located approximately at the level of the upper end of the pipe 14. A hose clamp 28b encircles the lower end of both tubes for the purpose of securing the device to the pipe 14 and sealing the two tubes to one another and the pipe.

At least the cup portion 24a—24b of the attachment is selected from a material that is nonfibrous, nonabsorbent, oil-resistant, highly pliable yet self-sustaining, and capable of retaining its resiliency and pliability over a long service life even in the environment of an internal combustion engine. One material I have found to be practical is neoprene.

Figure 4:
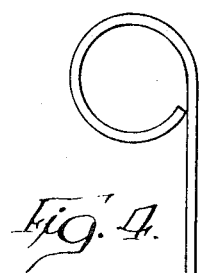
FIG. 4 is an illustration showing performance of the wiping function pursuant to the invention.

In use, the dip stick 16 is inserted into the pipe 14 in the conventional manner, with the cap 18 of the stick closing the upper end of the pipe as shown in FIGS. 2 and 3. By virtue of its large internal diameter, the cup portion 24a—24b of the attachment accommodates the conventional dip stick, including its cap, without modification thereto. When it is desired to measure the oil level in the crank case 12, or any other liquid reservoir with which my device may be employed, the operator grasps the finger grip of the dip stick in one hand, raises the stick slightly, and with the thumb and forefinger of the other hand squeezes inwardly on the resilient walls of the cup 24a—24b as indicated by the arrows in FIG. 4. This squeezing action brings opposed surfaces of the resilient cup into engagement with the opposite sides of the dip stick, and being pliant, the resilient material conforms to and circumferentially encompasses the dip stick in wiping relationship therewith. Then, the dip stick is withdrawn, whereupon the stick is wiped clean by the pliant material. The oil or other liquid wiped from the stick is captured and retained by the cup 24a—24b and returned by the shoulder 26a—26b directly to the crank case or reservoir through the interior of the pipe 14. To facilitate return of the liquid, the shoulder may be tapered downwardly and inwardly as shown in the drawings. In use, the stick may not be completely withdrawn from the cup, the operator simply stopping the withdrawal movement when he senses the end of the stick between his thumb and forefinger.

To facilitate grasping of the walls of the cup and also to facilitate the wiping action, said walls may bear surface irregularities, such as the protrusion 30a of FIG. 2 or the recesses 30b of FIG. 3, or a combination thereof.

After the stick has thus been wiped clean, the operator removes his finger from the cup 24a—24b whereupon the cup returns to its normal position as shown in FIGS. 2 and 3, so that the operator may thereafter proceed to reinsert the stick in the reservoir and remove the stick from the pipe (without wiping action) to take the liquid level measurement.

It is thus apparent that the invention provides a highly efficient and improved mode of taking liquid level measurements with a dip stick, and that it does so by means of a very simple attachment and without requiring replacement or modification of either the dip stick or the guide pipe conventionally associated with the reservoir. Thus, the objects and advantages of the invention have been shown to be attained in a convenient, economical and practical manner.

While I have shown and described what I regard to be the preferred embodiment of my invention, it is to be appreciated that the various changes, rearrangements and modifications may be made therein without departing from the scope of the invention, as defined by the appended claims.

I claim:

1. A wiper for the dip stick of a liquid reservoir having a dip stick guide pipe, consisting essentially of a tubular pliant wiper member comprising a first tubular portion of an inner diameter approximately equal to the outer diameter of the guide pipe adapted to be pliantly and adjustably telescoped over the upper end of the guide pipe for sealing engagement therewith, a cup portion of a substantially larger inner diameter adapted to extend upwardly above the guide pipe and a shoulder between said portions adapted to be located at approximately the upper end of the guide pipe, said cup portion being nonfibrous, essentially nonabsorbent and squeezable between the thumb and finger of an operator into wiping contact with the dip stick as the latter is removed from the guide pipe and normally flexing itself outwardly to accommodate unobstructed passage of the dip stick, said cup portion catching the liquid wiped from the dip stick and said shoulder directing the liquid back into the guide pipe, said cup portion accommodating the upper extremities of the dip stick and said shoulder accommodating normal engagement of the dip stick in the guide pipe whereby neither the dip stick nor the guide pipe requires replacement or modification, and a hose clamp around said first tubular portion for sealingly securing the wiper to the guide pipe.

2. The wiper of claim 1 wherein the wiper member is a unitary molded element.

3. The wiper of claim 1 wherein said first tubular portion comprises a first tube, said cup portion comprises a second tube telescoped over said first tube and said clamp encircles the lower end of said second tube for sealingly securing said tubes to one another and the guide pipe.

4. The wiper of claim 1 wherein said cup portion is provided with external surface irregularities to facilitate grasping of the same and performance of the wiping function.

5. The wiper of claim 1 wherein said shoulder slopes inwardly and downwardly toward the upper end of the guide pipe.